US012759611B2

(12) United States Patent
Kim

(10) Patent No.: US 12,759,611 B2
(45) Date of Patent: Oct. 13, 2026

(54) STEERING WHEEL-MOUNTED BUTTON MODULE

(71) Applicants: HYUNDAI MOTOR COMPANY, Seoul (KR); KIA CORPORATION, Seoul (KR)

(72) Inventor: Eun Sik Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 1 day.

(21) Appl. No.: 18/883,744

(22) Filed: Sep. 12, 2024

(65) Prior Publication Data

US 2025/0326423 A1 Oct. 23, 2025

(30) Foreign Application Priority Data

Apr. 19, 2024 (KR) ........................ 10-2024-0052777

(51) Int. Cl.
*B62D 1/04* (2006.01)

(52) U.S. Cl.
CPC .................................... *B62D 1/046* (2013.01)

(58) Field of Classification Search
CPC ............ B60R 21/203; B60K 2360/782; B62D 1/046; B62D 1/183
See application file for complete search history.

(56) References Cited

U.S. PATENT DOCUMENTS

| | | | | |
|---|---|---|---|---|
| 6,760,569 | B1 * | 7/2004 | Chen | B60R 11/0264 455/99 |
| 2016/0375924 | A1 * | 12/2016 | Bodtker | B60K 35/60 74/552 |
| 2020/0171947 | A1 | 6/2020 | Derrick et al. | |

FOREIGN PATENT DOCUMENTS

| | | | |
|---|---|---|---|
| CN | 204264048 | U | 4/2015 |
| JP | H11338373 | A | 12/1999 |
| KR | 20000027602 | A | 5/2000 |
| KR | 20050054610 | A | 6/2005 |
| KR | 20080047825 | A | 5/2008 |
| KR | 101310514 | B1 | 9/2013 |

* cited by examiner

*Primary Examiner* — Victor L Macarthur
(74) *Attorney, Agent, or Firm* — Lempia Summerfield Katz LLC

(57) ABSTRACT

A steering wheel-mounted button module may include a case mounted on a steering wheel body, a retractable unit installed inside the case to be movable forward and backward, and a button unit rotatably installed on the retractable unit. In particular, the button unit includes a rear end elastically supported to rotate away from the retractable unit and a button. The button unit may rotate forward to unfold based on the retractable unit moving forward out of the case.

16 Claims, 17 Drawing Sheets

STEERING WHEEL-MOUNTED BUTTON MODULE

CROSS REFERENCE TO RELATED APPLICATION

This application claims priority to Korean Patent Application No. 10-2024-0052777, filed Apr. 19, 2024, the entire contents of which are incorporated herein for all purposes by this reference.

BACKGROUND

Field

The present disclosure relates to a steering wheel-mounted button module, and more particularly, to a button module for mounting on a steering wheel of a vehicle.

Description of the Related Art

The steering wheel mounted in front of the driver's seat is the most visible and operable area for the driver in a vehicle. In general, a steering wheel is equipped with buttons for functions (e.g., volume control) that can be operated while driving. However, since the area on the steering wheel where buttons can be mounted is limited, buttons with various functions are not available on the steering wheel and are instead mounted on the center fascia or the Audio, Video, Navigation (AVN) system.

However, buttons for functions such as heater and air conditioner control, air recirculation, auto hold, and defrosting need to be operated immediately while driving. These buttons, mounted on the center fascia, require the driver to stretch their arm to operate them while also looking directly at the buttons, making immediate operation during driving difficult.

The statements in this section merely provide background information related to the present disclosure and may not constitute prior art.

SUMMARY

An embodiment of the present disclosure provides a steering wheel-mounted button module capable of reducing manufacturing costs by eliminating the need for button mounting structures on the center fascia in such a way as to relocate buttons from the center fascia to the steering wheel in a vehicle and capable of maximizing visibility and operability of buttons by allowing manual popup of buttons on the steering wheel, rather than on the center fascia or AVN.

Furthermore, an embodiment of the present disclosure provides a steering wheel-mounted button module capable of improving driver convenience by enabling easy operation without needing to locate or reach for center fascia buttons and capable of increased AVN size and additional storage space by eliminating the need for dedicated button space and location on the center fascia.

Additionally, an embodiment of the present disclosure provides a steering wheel-mounted button module capable of enhancing aesthetics by featuring a slim button section to be unfold and popup from the steering towards the driver.

The technical objects of this present disclosure are not limited to those mentioned above, and other objects not described herein with can be clearly understood by those having ordinary skill in the art from the descriptions below.

According to an embodiment of the present disclosure, a steering wheel-mounted button module for a vehicle may include: a case mounted on a steering wheel body, a retractable unit installed inside the case and configured to move forward and backward, and a button unit rotatably installed on the retractable unit. In particular, the button unit includes a rear end elastically supported to rotate away from the retractable unit, and at least one button. The button unit may rotate forward to unfold based on the retractable unit moving forward out of the case.

The case may be provided with guide slots formed on both inner sides thereof into which guide protrusions protruding on both sides of the retractable unit are inserted and guided.

The case may be mounted on the upper surface of the steering wheel body.

The case and the retractable unit may be provided with a first magnetic member and a second magnetic member, respectively, to attract each other.

The first magnetic member may be provided on both sides of the front end of the case, and the second magnetic member may be provided on both sides of the rear surface of a front frame attached to the front end of the retractable unit.

The retractable unit may include a main frame configured to move within the case, a front frame extending downward from the front of the main frame, side frames extending downward from both side ends of the main frame, and a rear frame extending downward from the rear end of the main frame.

The side frames may be formed from the center to the rear end along the side ends of the main frame.

The button unit, at the rear end thereof, may be hinged to the front ends of the side frames.

The front frame may be provided with a handle for the driver to grip to operate the retractable unit.

The handle may protrude downward from both sides of the lower end of the front frame.

The button unit may include a button pad with the at least on button, a hinge pin penetrating through the rear end of the button pad and rotatably coupled to the retractable unit, and an elastic member provided on the hinge pin to elastically support the button pad to rotate away from the retractable unit.

The button unit may be positioned at the bottom of the main frame, and the hinge pin may rotatably be coupled to the front end of the side frames.

The button pad may be provided with step portions that are situated on both sides of the main frame.

According to another embodiment of the present disclosure, a steering wheel-mounted button module may include: a case a case mounted on a steering wheel body; a retractable unit installed inside the case and configured to move forward and backward; a button unit rotatably installed on the retractable unit, having a rear end elastically supported to rotate away from the retractable unit, and comprising a button; and a drive unit installed on the case to provide power to move the retractable unit.

The drive unit may be provided with a gear shaft with threads on the outer surface thereof, and the retractable unit, on one side thereof, may be provided with a gear shaft connector through which the gear shaft passes, the gear shaft connector having threads formed on the inner circumferential surface thereof.

The drive unit may be installed on one side of the case.

The case may be provided with guide slots formed on both inner sides thereof into which guide protrusions protruding on both sides of the retractable unit are inserted and guided.

The case may be mounted on the upper surface of the steering wheel body.

DETAILED DESCRIPTION

Figure 1:
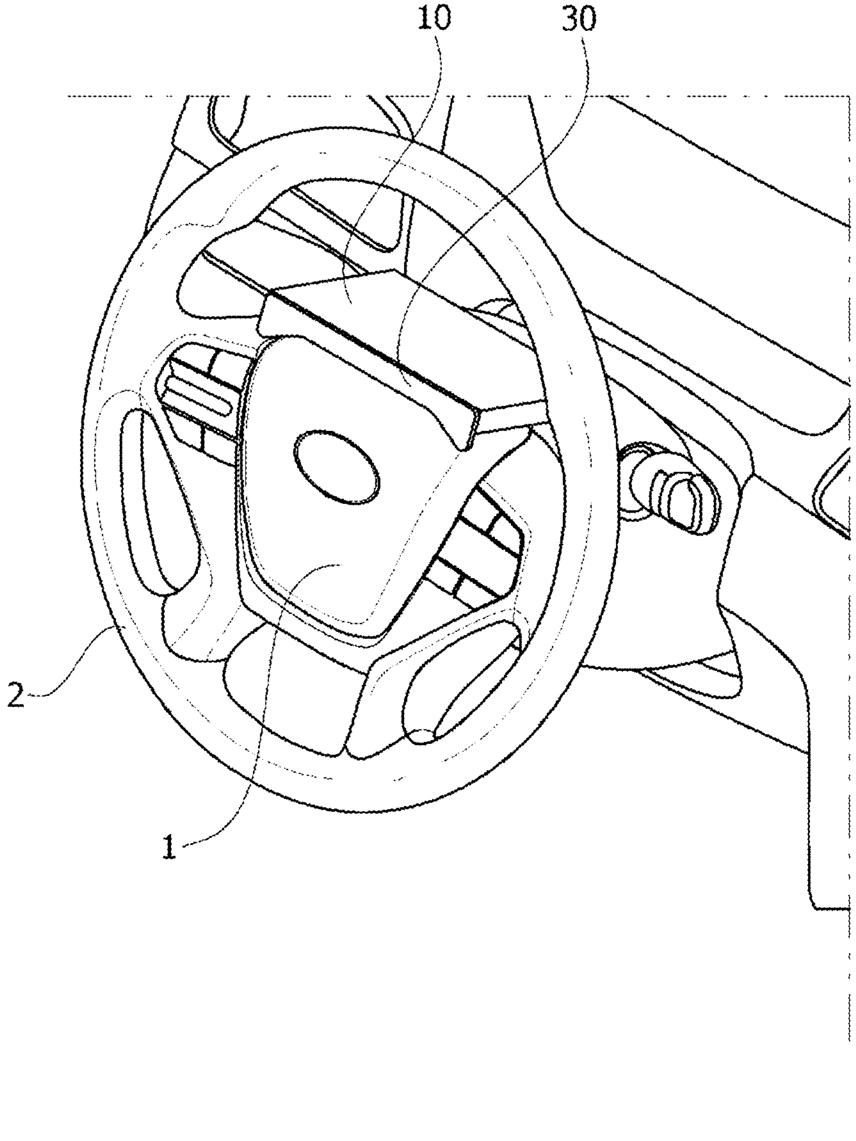
FIG. 1 is a perspective view illustrating a button module mounted on a steering wheel according to an embodiment of the present disclosure.

While the present disclosure admits various modifications, the following detailed descriptions and drawings focus on some embodiments for clarity. However, such embodiments are not intended to limit the present disclosure and it should be understood that the embodiments encompass all modifications, equivalents, and alternatives within the spirit and scope of the present disclosure. Detailed descriptions of well-known technologies may be omitted to avoid obscuring the subject matter of the present disclosure.

Terms such as "first," "second," etc. may be used to describe various components, but the components should not be limited by these terms. The terms are used only for distinguishing one component from another component.

The terminology used in this application is employed merely to describe specific embodiments and is not intended to limit the scope of the present disclosure. The singular forms are intended to include the plural forms as well unless the context clearly indicates otherwise. In this application, terms such as "comprising" or "having" indicate the presence of the features, numbers, steps, operations, components, or parts listed in the specification, without excluding the presence or possibility of one or more other features, numbers, steps, operations, components, or parts or their combinations.

Throughout the present disclosure, the term "connected" not only means that two or more components are directly connected but also includes indirect connections via intermediary components, electrical connections, and instances where components are referred to by different names based on their position or function but are considered as a whole. When a component, device, element, or the like of the present disclosure is described as having a purpose or performing an operation, function, or the like, the component, device, or element should be considered herein as being "configured to" meet that purpose or to perform that operation or function.

Additionally, when a component is described as being formed or placed "on or under" another component, "on (above)" or "under (below)" may include not only cases where two components directly contact each other but also cases where one or more other components are formed or positioned between the two components. Additionally, when expressed as "on (above or under (below)," it may include not only the upward direction but also the downward direction relative to a single component.

Hereinafter, a description is made of the steering wheel-mounted button module according to an embodiment of the present disclosure with reference to accompanying drawing, where identical or corresponding components are assigned the same reference numerals and repetitive descriptions are omitted.

Figure 2:
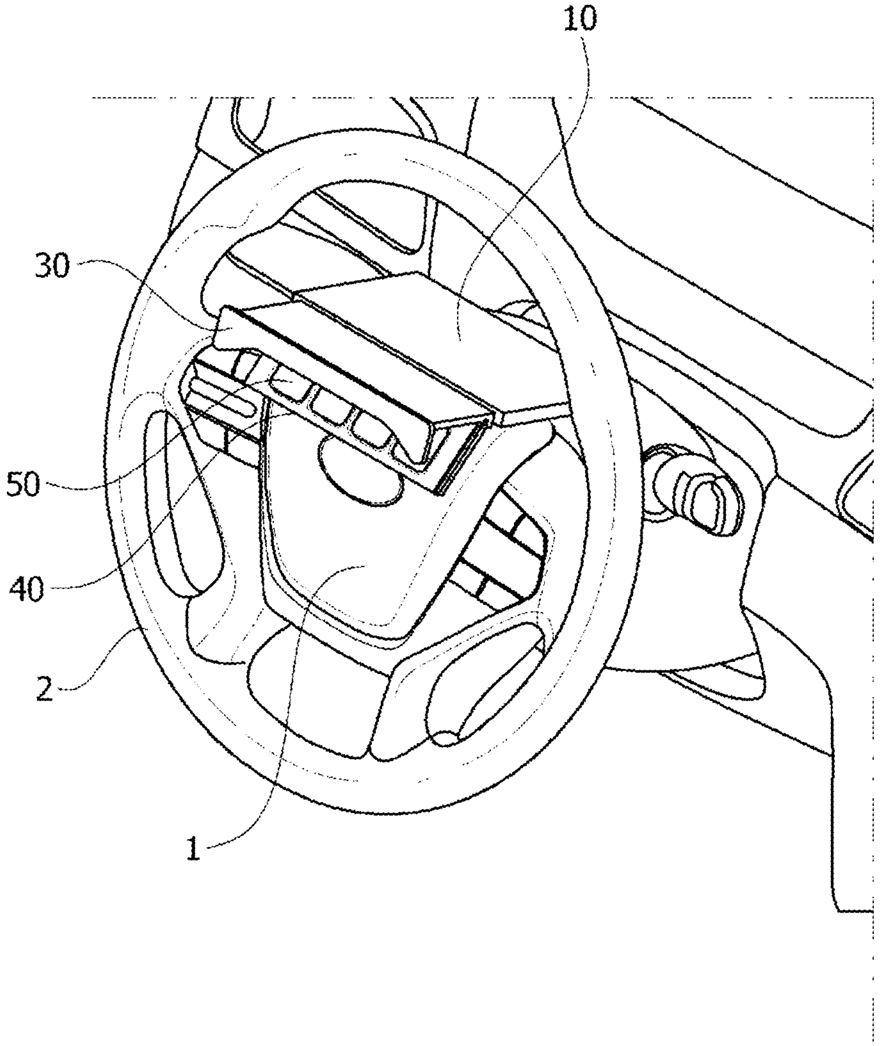
FIG. 2 is a perspective view illustrating a steering wheel-mounted button module popped up from the steering wheel according to an embodiment of the present disclosure.
Figure 3:
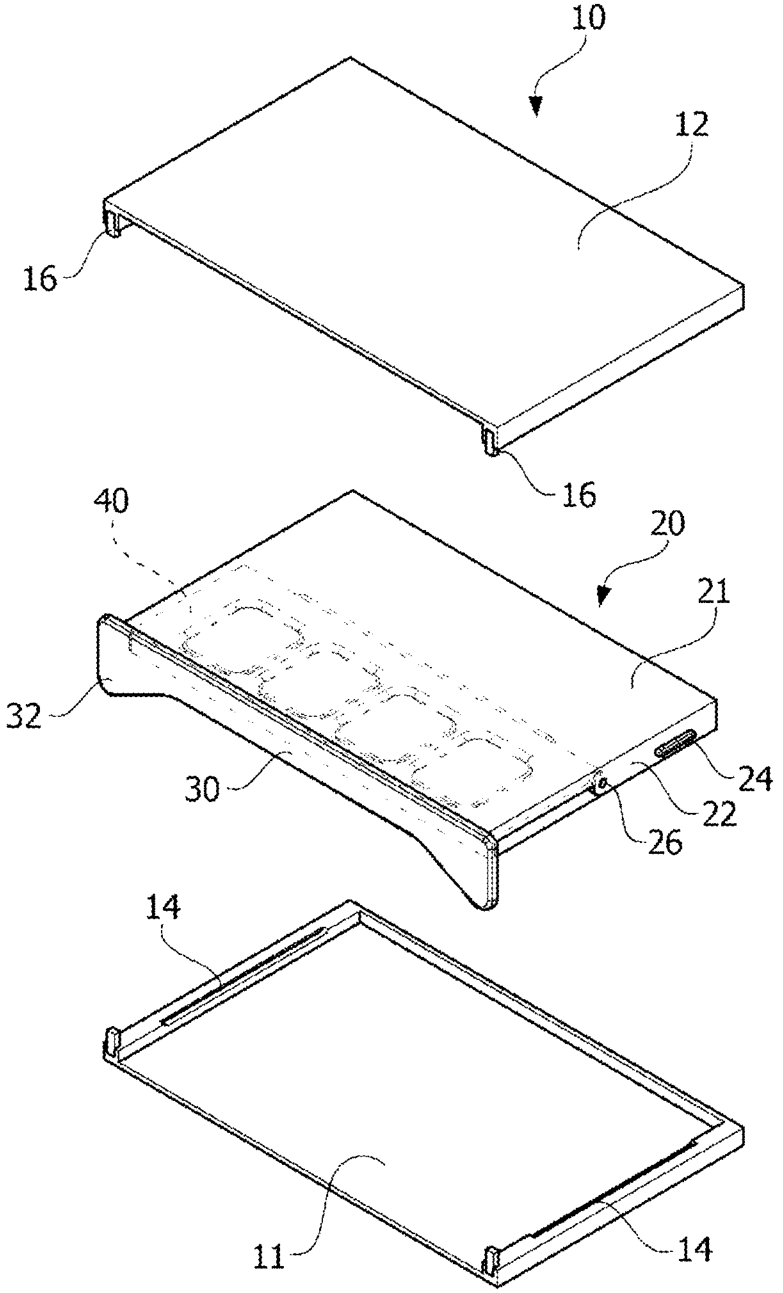
FIG. 3 is an exploded perspective view illustrating a steering wheel-mounted button module according to an embodiment of the present disclosure.
Figure 4:
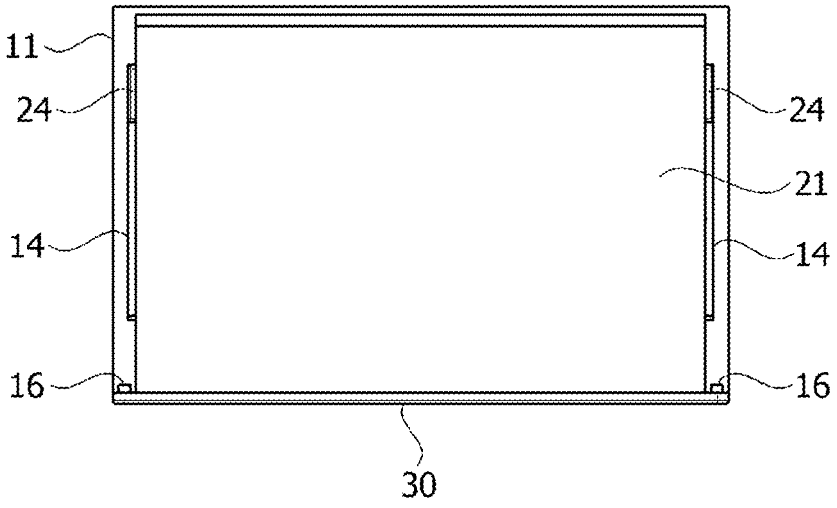
FIG. 4 is a plan view illustrating the stowed state of a retractable unit mounted on a lower case.
Figure 5:
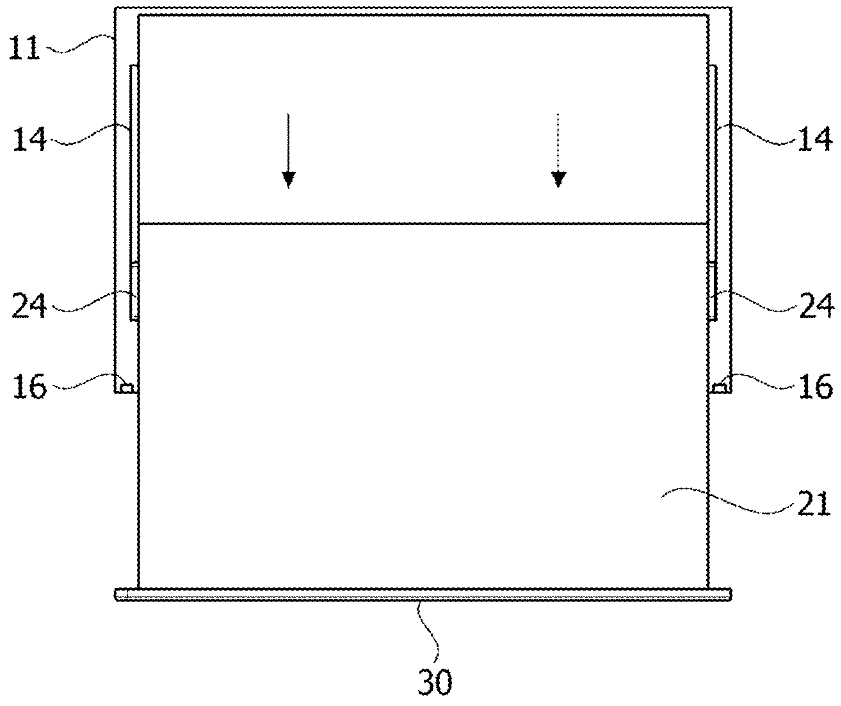
FIG. 5 is a plan view illustrating the extended state of the retractable unit mounted on a lower case.

FIG. 1 is a perspective view illustrating a button module mounted on a steering wheel according to an embodiment of the present disclosure, FIG. 2 is a perspective view illustrating a steering wheel-mounted button module popped up from the steering wheel according to an embodiment of the present disclosure, FIG. 3 is an exploded perspective view illustrating a steering wheel-mounted button module according to an embodiment of the present disclosure, FIG. 4 is a plan view illustrating the stowed state of a retractable unit mounted on a lower case, and FIG. 5 is a plan view illustrating the extended state of the retractable unit mounted on a lower case.

As illustrated, the steering wheel-mounted button module according to an embodiment of the present disclosure may include a case 10 mounted on the steering wheel body 1, a retractable unit 20 movably installed inside the case 10 to be movable forward and backward, and a button unit 40 rotatably installed on the retractable unit 20. The button unit 40 includes a rear end elastically supported to rotate away from the retractable unit 20 and buttons 50 for vehicle control.

The steering wheel body 1 is installed in front of the driver for vehicle operation. The outer side of the steering wheel body 1 is equipped with a rim 2 along its circumference. With reference to FIG. 1, the steering wheel-mounted button module according to an embodiment of the present disclosure may be mounted on the upper surface of the steering wheel body 1. This is merely one embodiment, and the steering wheel-mounted button module may also be mounted on the lower surface or the sides of the steering wheel body 1. In other words, the button module can be mounted on any surface of the steering wheel, as long as the button module can pop up and unfold towards the driver from its mounted position on the steering wheel body 1. In one form, to facilitate easy operation by the driver, the button module may be mounted on the upper surface of the steering wheel body 1.

As illustrated in FIG. 2 and described in more detail below, when the retractable unit 20 stowed inside the case 10 is extended forward, the button unit 40 rotates downward and unfolds simultaneously. In this manner, when the button unit 40 pops up, unfolding towards the driver, the driver may easily operate various buttons 50 while driving.

With reference to FIG. 3, the case 10 may have a substantially flat cuboid shape and may include a lower case 11 and an upper case 12 that combines to cover the top of the lower case 11. The case 10 shown in the drawing is merely an illustrative example, and the case 10 may formed as a single piece instead of two. The lower case 11 and the upper case 12 form an inner space for the movement of the retractable unit 20, with the front side open to allow the retractable unit 20 to extend outward. In this embodiment, the lower case 11 and the upper case 12 are configured to be combined together by cutting half of the height in the vertical direction, however this configuration is not restrictive. In another form, the upper case 12 may cover only the lower case 11 to form the upper surface of the lower case and be combined with the lower case 11.

With reference to FIGS. 4 and 5, the case 10 may be provided with guide slots 14 formed on both inner sides thereof, into which guide protrusions 24 protruding on both sides of the retractable unit 20 are inserted and guided. The guide slots 14 have an elongated shape extending in the front-to-rear direction on both inner sides of the case 10. In this embodiment, the guide slots 14 are each formed on both inner sides of the lower case 11 and the upper case 12 such that, when combined, they form a single guide slot 14 on each side. In another form, the guide slots 14 may also be formed on either the lower case 11 or the upper case 12 side.

With reference back to FIG. 3, the case 10 is provided with a first magnetic member 16 on each side of the front end thereof. The first magnetic member 16 has a polarity opposite to that of the second magnetic member 34 described below, causing the first and second magnetic members to attract each other. Accordingly, when stowed in the case 10, the retractable unit 20 may be maintained in an attached state to the case 10 due to the magnetic force between the first magnetic member 16 and the second magnetic member 34. In order to extend the retractable unit 20, the driver pulls the retractable unit 20 forward while overcoming the attraction force between the first magnetic member 16 and the second magnetic member 34. Then, the retractable unit 20 may be slid out from the case 10 and extended forward.

Figure 6:
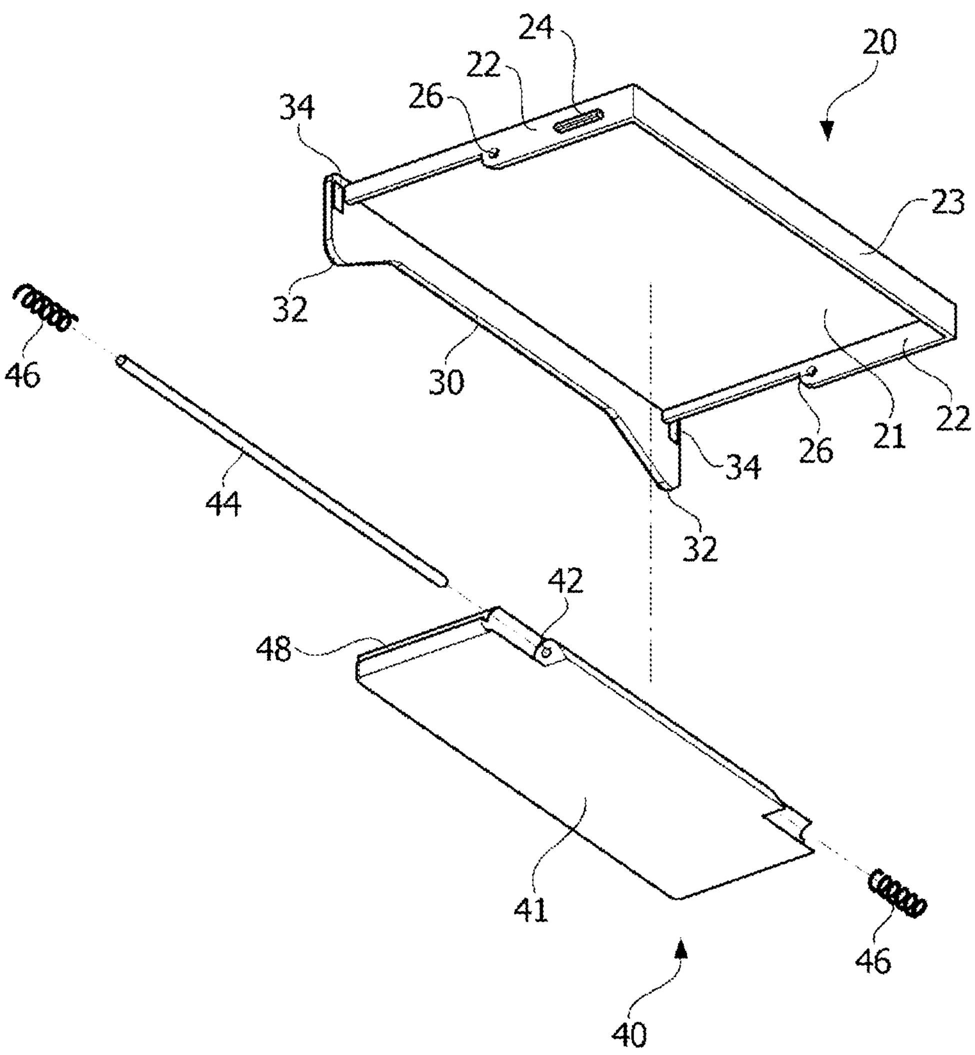
FIG. 6 is an exploded perspective view illustrating the retractable unit and button unit of a steering wheel-mounted button module according to an embodiment of the present disclosure.
Figure 7:
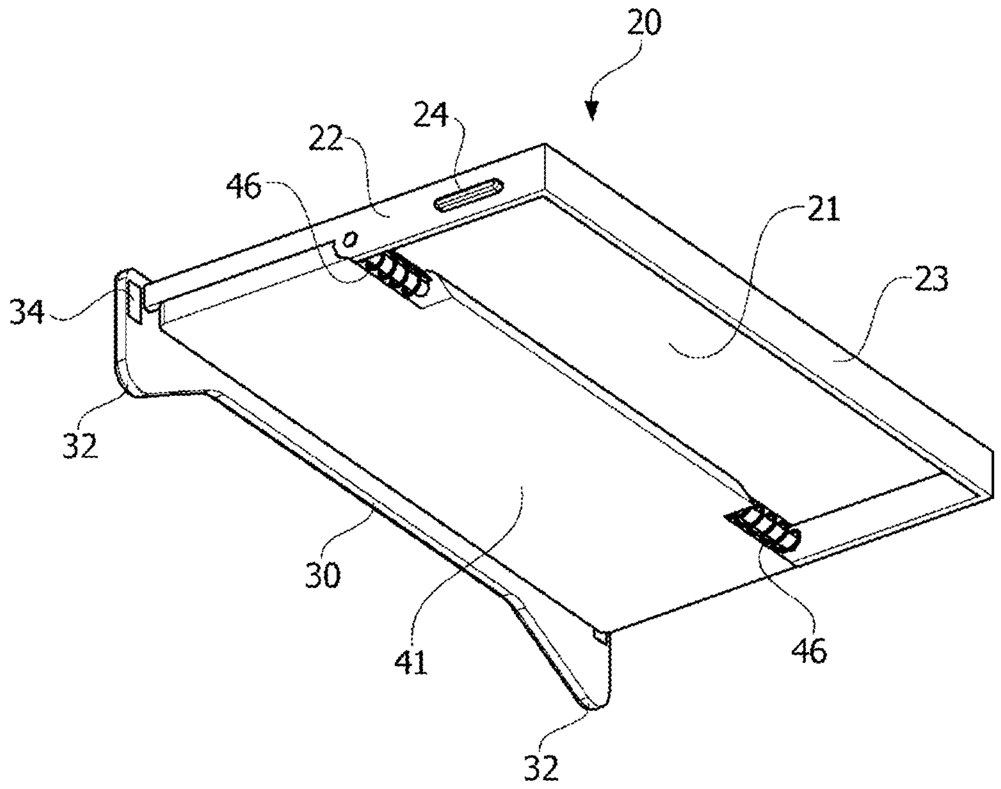
FIG. 7 is an exploded perspective view illustrating the retractable unit and button unit of a steering wheel-mounted button module according to an embodiment of the present disclosure.
Figure 8:
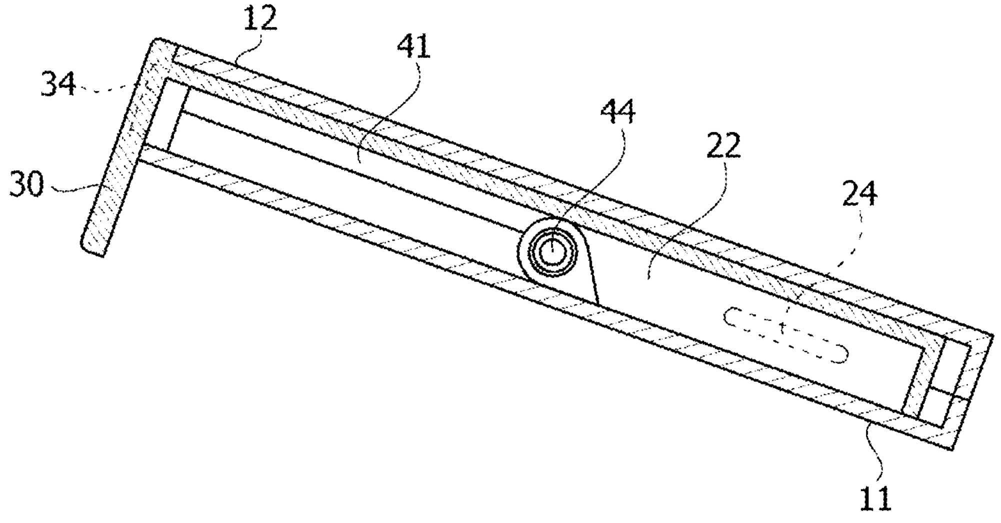
FIG. 8 is a side view illustrating a steering wheel-mounted button module according to an embodiment of the present disclosure.
Figure 9:
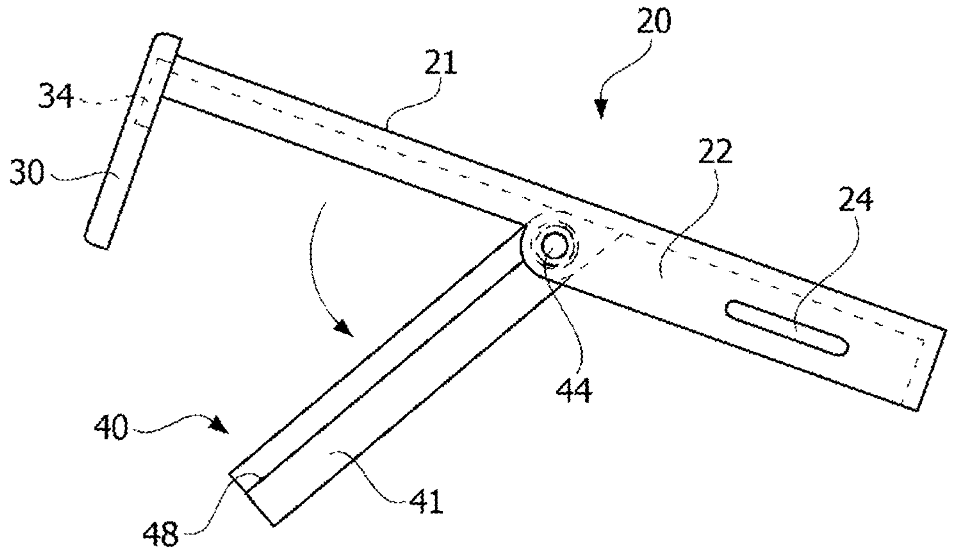
FIG. 9 is a side view illustrating a button unit unfolded from a retractable unit according to an embodiment of the present disclosure.

FIG. 6 is an exploded perspective view illustrating the retractable unit and button unit of a steering wheel-mounted button module according to an embodiment of the present disclosure, FIG. 7 is an exploded perspective view illustrating the retractable unit and button unit of a steering wheel-mounted button module according to an embodiment of the present disclosure, FIG. 8 is a side view illustrating a steering wheel-mounted button module according to an embodiment of the present disclosure, and FIG. 9 is a side view illustrating the button unit unfolded from a retractable unit according to an embodiment of the present disclosure;

With reference to FIG. 6, the retractable unit 20 may include a main frame 21 movable within the case 10, side frames 22 extending downward from both side ends of the main frame 21, a rear frame 23 extending downward from the rear end of the main frame 21, and a front frame 30 extending downward from the front of the main frame 21. According to an embodiment, the specific frame structure of the retractable unit 20 described above may be integrally formed.

The main frame 21 has a rectangular plate shape to be housed inside the case 10. The main frame 21 is open on the bottom and provided with the side frames 22 and rear frame 23 on both lateral ends and the rear end. As described above, the side frames 22 are provided with the guide protrusions 24 that are inserted into the guide slots 14. The guide protrusions 24 may be provided on the outer surface of the side frames 22 with a predetermined length in the front-to-rear direction. The side frames 22 may be provided with hinge holes 26 through which both ends of a hinge axis 44 are respectively penetrated and supported.

In this embodiment, the side frame 22 may not be provided along the entire lateral ends of the main frame 21 but may be provided from the center to the rear end. For example, the side frame 22 may extend from the center of the lateral end of the main frame 21 to the rear end of the main frame 21. In this case, the hinge hole 26 may be formed at the front end of the side frame 22. As will be explained below, since the side frames 22 are provided only partially along the lateral ends of the main frame 21, the button unit 40 may be easily unfold forward without the retractable unit 20 being excessively extended forward.

The front frame 30 may be provided upright to form the front of the retractable unit 20. The front frame 30 may also be equipped with a handle 32 for the driver to grip when operating the retractable unit 20. The handle 32 is designed to protrude downward from the bottom of the case 10 when stored in the case 10, making it easier for the driver to grip.

The front frame 30 is provided with the second magnetic members 34 on both sides of the rear surface thereof. As described above, the second magnetic members 34 interact with the first magnetic members 16 to maintain the retractable unit 20 in a stowed state within the case 10.

The button unit 40 may be made in a roughly flat cuboid shape. The button unit 40 may include a button pad 41 with buttons 50, and a hinge pin 44 that penetrates through the rear end of the button pad 41 and is rotatably coupled to the retractable unit 20 The button unit 40 may further include elastic members 46 provided on the hinge pin 44 to elastically support the button pad 41 to rotate away from the retractable unit 20.

The button unit 40 is provided with a pin hole 42 formed in the rear end thereof through which the hinge pin 44 penetrates. The elastic members 46 are respectively provided at both ends of the hinge pin 44 to provide elastic force. The elastic members 46 may provide elastic force to rotate in the direction where the button unit 40 moves away from the retractable unit 20, i.e., in the direction where the button unit 40 unfolds relative to the retractable unit 20. The elastic members 46 are connected at one end to the retractable unit 20 and at the other end to the button unit 40, providing elastic support. For example, a torsion spring may be used as the elastic member 46 to provide torsional elasticity in the rotational direction.

With reference to FIGS. 7 to 9, the button section 40 may have a length of approximately half the length of the retractable unit 20 in the front-to-back direction. The button unit 40, at the rear end thereof, is hinged to the front ends of the side frames 22. In this way, since the hinge holes 26 are formed on the front ends of the side frames 22, the rear end of the button unit 40 may be arranged on the front side centered on the hinge holes 26. With this arrangement, even though the button unit 40 has half the length of the retractable unit 20, it may be positioned inside of the retractable unit 20.

Accordingly, even though the retractable unit 20 is partially (halfway) extended forward from the case 10, the button unit 40 may unfold toward the driver as shown in FIG. 9. In another embodiment, the button pad 41 may be provided with step portions 48 that are situated on both sides of the main frame 21. The step portions 48 are situated on the lower sides of the main frame 21, allowing the button unit 40 to be tightly secured to the retractable unit 20.

This configuration, where the retractable unit 20 and button unit 40 are stacked for movement together within the case 10, allows for slim design of the entire button module, as shown in FIG. 8.

Figure 10:
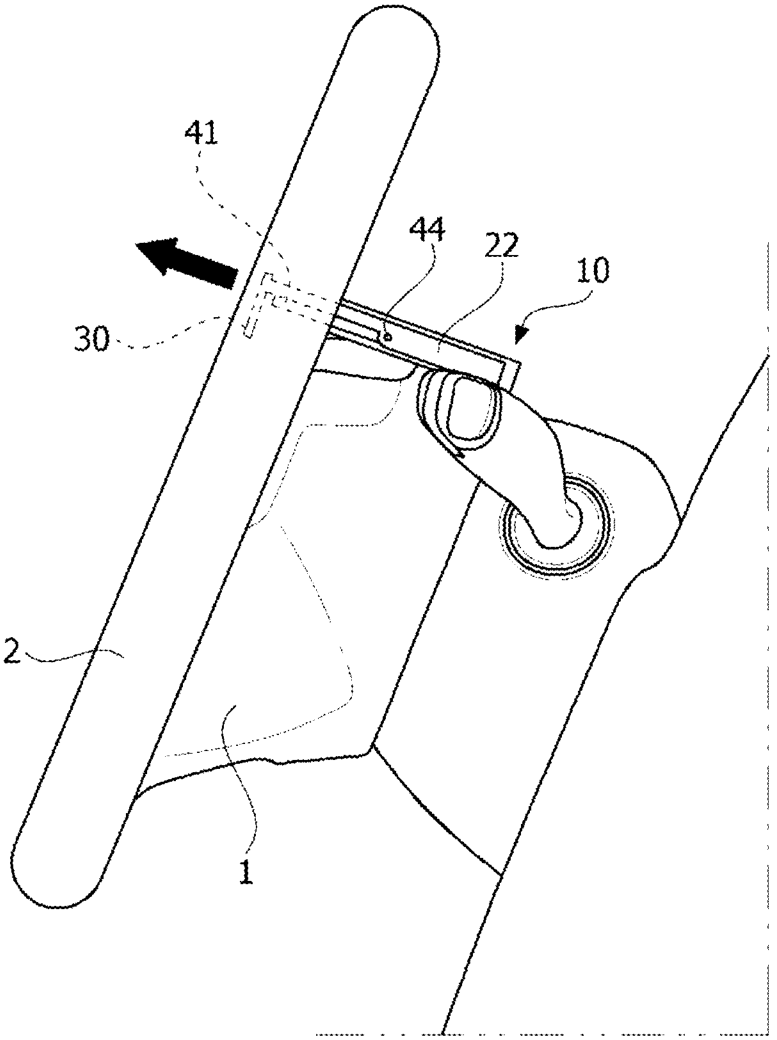
FIG. 10 is a side view illustrating mounted on a steering wheel according to an embodiment of the present disclosure.
Figure 11:
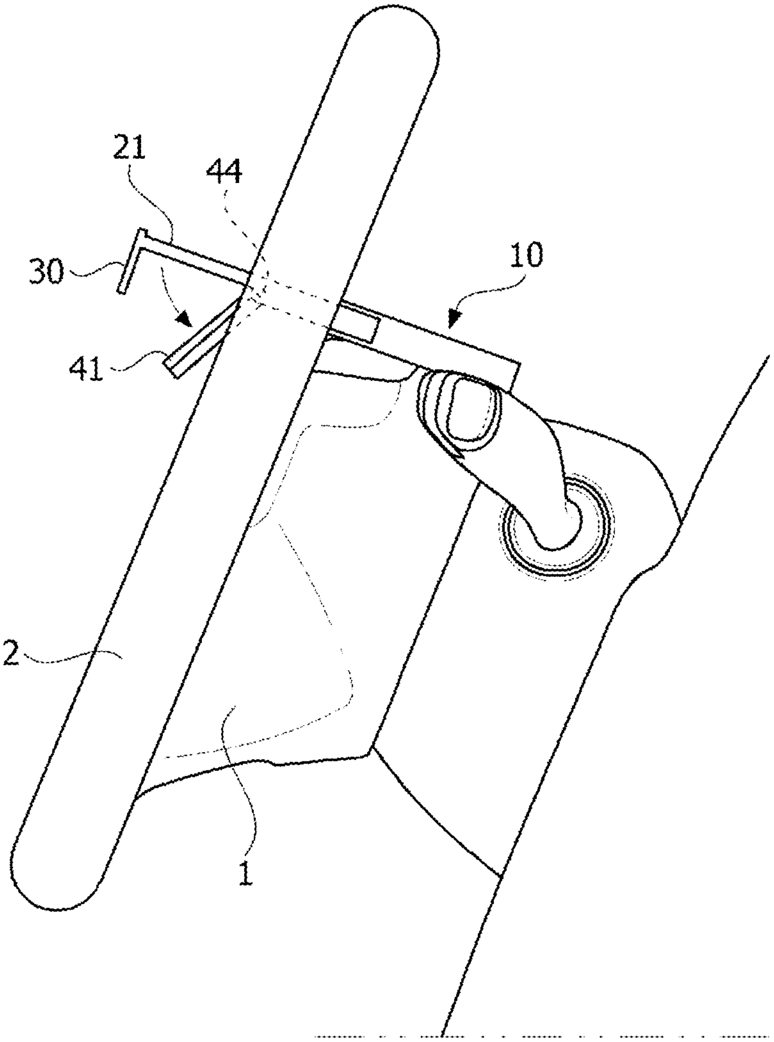
FIG. 11 is a side view illustrating a steering wheel-mounted button module mounted on a steering wheel in the state where a button unit is unfolded according to an embodiment of the present disclosure.

FIG. 10 is a side view illustrating mounted on a steering wheel according to an embodiment of the present disclosure, and FIG. 11 is a side view illustrating a steering wheel-mounted button module mounted on a steering wheel in the state where a button unit is unfolded according to an embodiment of the present disclosure.

Since the rear end portion of the steering wheel-mounted button module is located at the bottom of the wheel body 1 as shown in FIG. 10, it is possible to avoid or prevent the retractable unit 20 from extending out of the case 10 by its own weight. Of course, the retractable unit 20 may be securely stowed in the case 10 due to the magnetic force of the first magnetic members 16 and the second magnetic members 34.

In this way, while driving with the retractable unit 20 stowed in the case 10, when it is necessary to operate the button 50, the user may pull the retractable unit 20 forward by gripping the handle 32. Then, overcoming the magnetic force of the first magnetic member 16 and the second magnetic member 34, the retractable unit 20 is pulled forward, and during the extension process, the button unit 40 rotates downward due to the elasticity of the elastic member 46, as shown in FIG. 11. In this state, the driver may selectively press the buttons 50 with the desired function to control the vehicle.

This embodiment allows the driver to manually deploy the slim button unit 40, eliminating the need for a separate drive unit, thereby reducing costs and maximizing vehicle layout.

Although the above description has focused on the structure where the driver pulls the retractable unit 20 by gripping the handle 32, the deployment structure of the retractable unit 20 can be configured in various ways. For example, the retractable unit 20 may be configured as a push-button type, where the driver presses the front of the retractable unit 20 to release the lock for extension, and then presses the front again to re-lock. In this embodiment, the handle 32 may not be provided separately.

FIGS. 12A to 12D are diagrams illustrating various button configurations of a steering wheel-mounted button module according to an embodiment of the present disclosure.

Figure 12A:
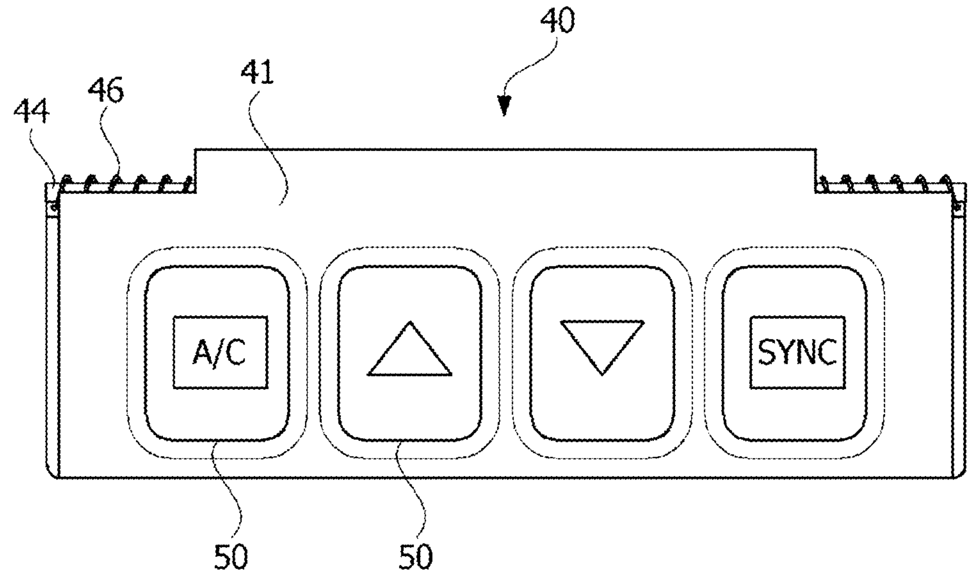
FIGS. 12A to 12D are diagrams illustrating various button configurations of a steering wheel-mounted button module according to an embodiment of the present disclosure.
Figure 12B:
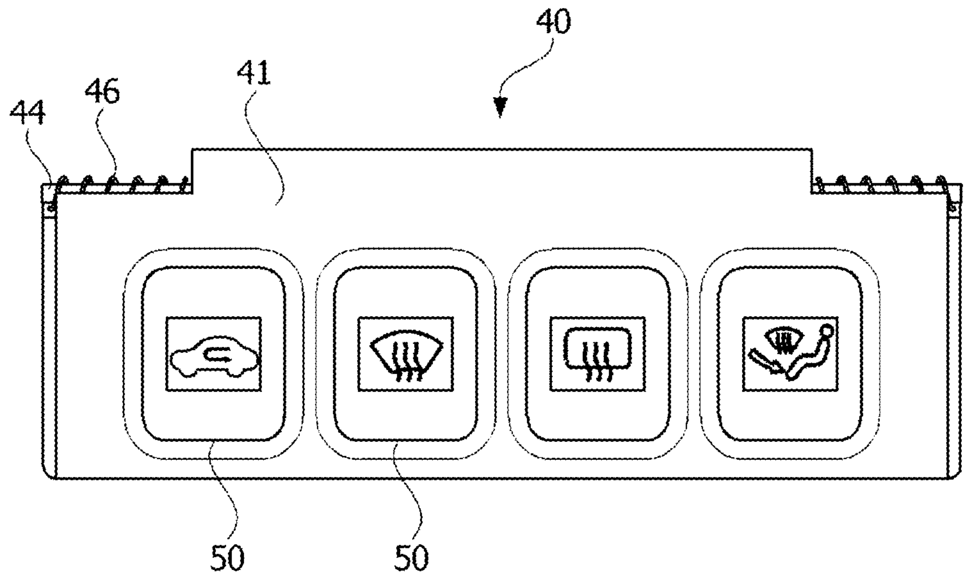
Figure 12C:
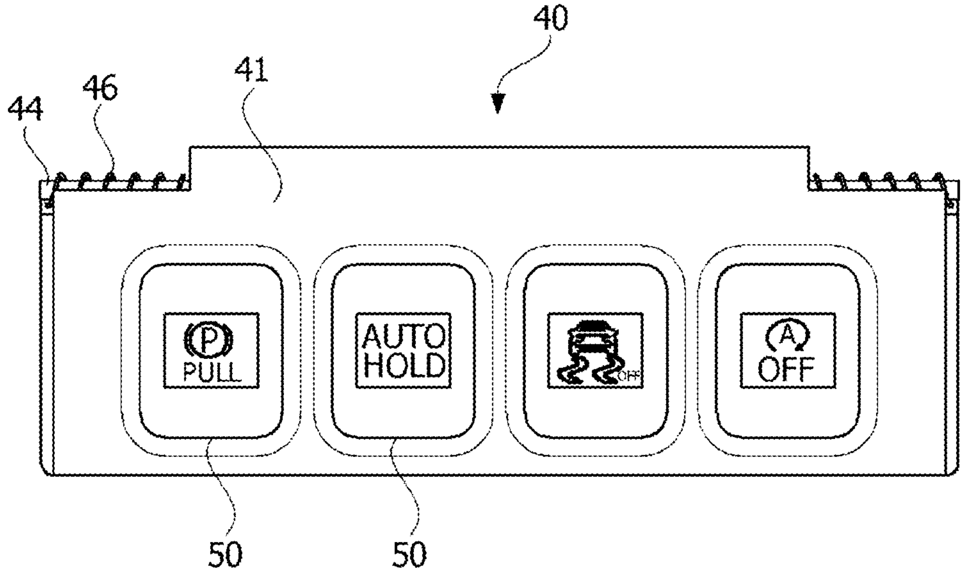

FIGS. 12A to 12D illustrate buttons 50 with various functions. In FIG. 12A, the buttons 50 are configured with air conditioning functionality. In FIG. 12B, the buttons 50 are configured with ventilation and defogging functionality. In FIG. are configured with driving safety 12C, the buttons

Figure 12D:
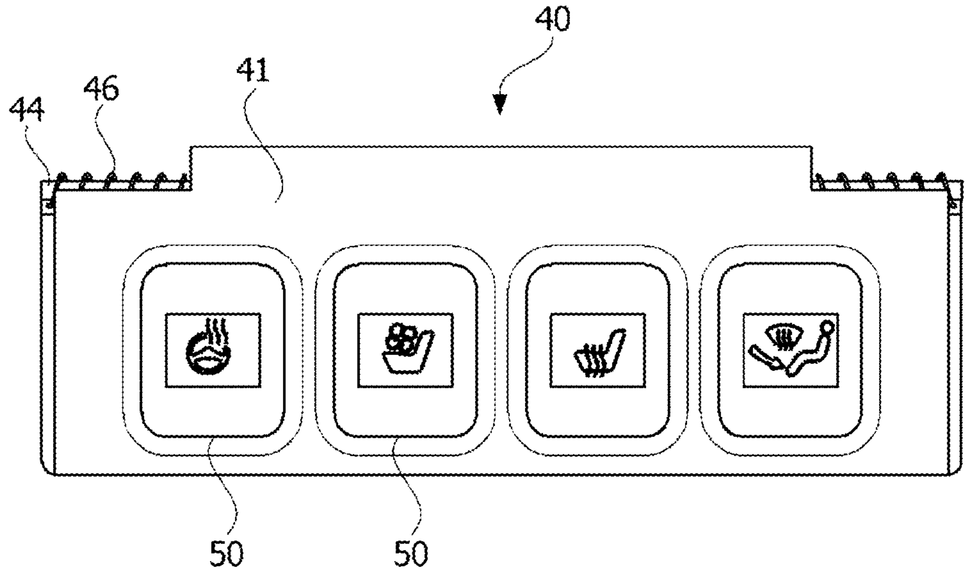

50 functionality. In FIG. 12D, the buttons 50 are configured with touch part temperature control functionality.

The buttons 50 illustrated above are merely examples presented in one embodiment, and the buttons 50 can be configured in various combinations as needed. For example, the buttons 50 may be configured by combining some functions as shown in FIGS. 12A to 12D, and the number of buttons 50 may also be configured to have four buttons per row in 2 rows.

This design is capable of reducing manufacturing costs by eliminating the need for button mounting structures on the center fascia in such a way as to relocate buttons 50 from the center fascia to the steering wheel in a vehicle and capable of maximizing visibility and operability of buttons 50 by allowing manual popup of buttons 50 on the steering wheel other than the center fascia or AVN. In other words, the driver can easily operate the buttons 50 without the need to reach or locate buttons on the center fascia. Additionally, the removal of the buttons 50 from the center fascia allows for an increase in AVN size and the creation of storage space.

Figure 13:
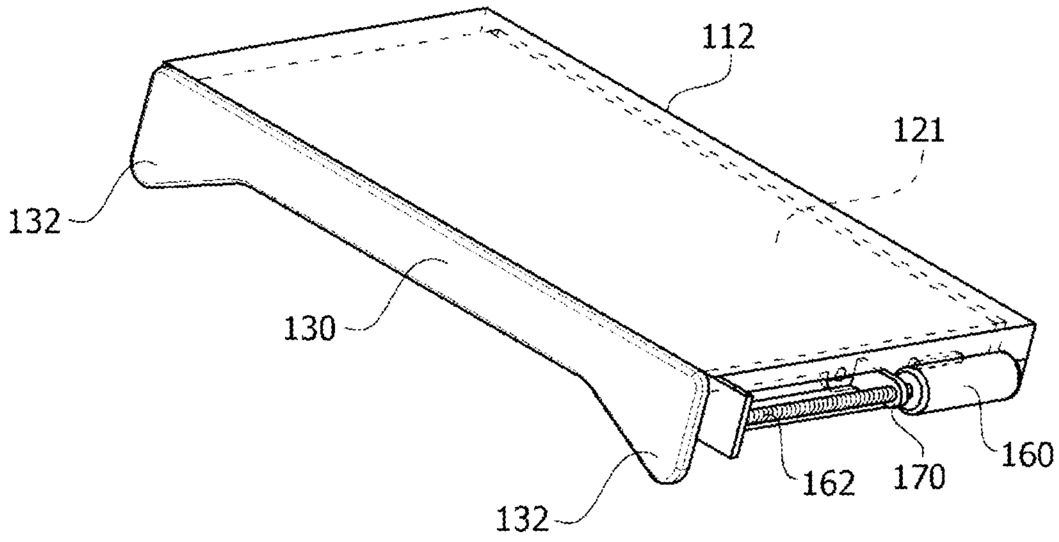
FIG. 13 is a perspective view illustrating a steering wheel-mounted button module according to another embodiment of the present disclosure.
Figure 14:
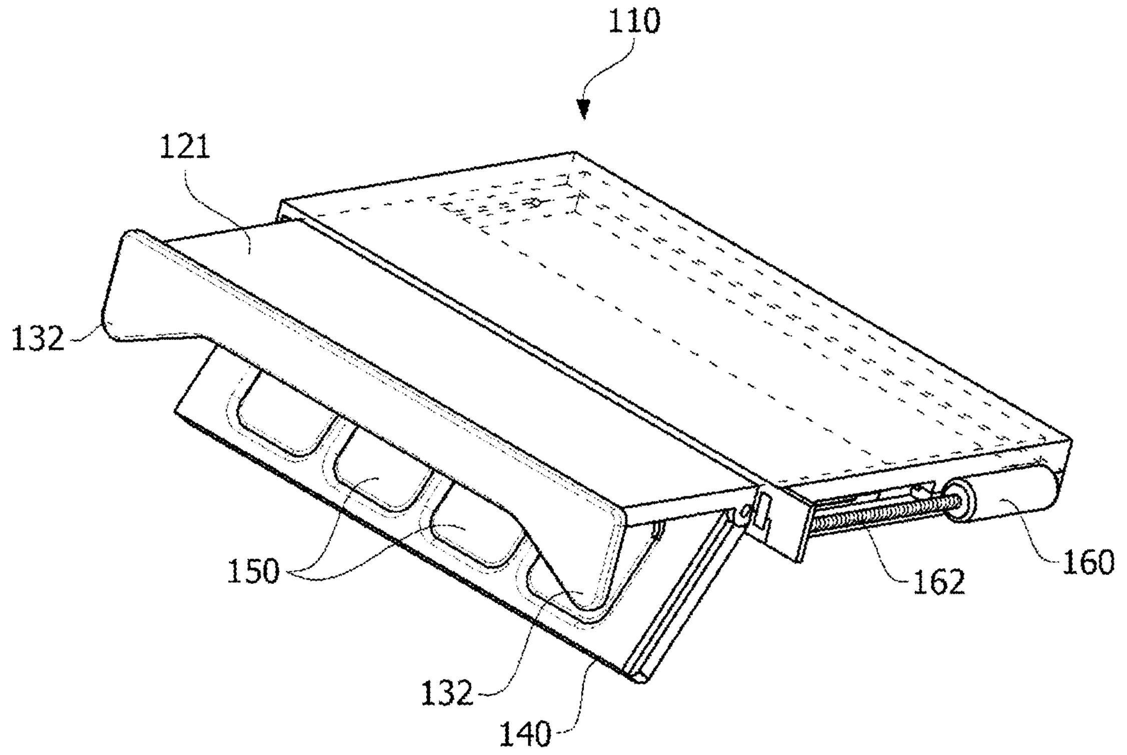
FIG. 14 is a perspective view illustrating a steering wheel-mounted button module in the state wherein a button unit is unfolded according to another embodiment of the present disclosure.
Figure 15:
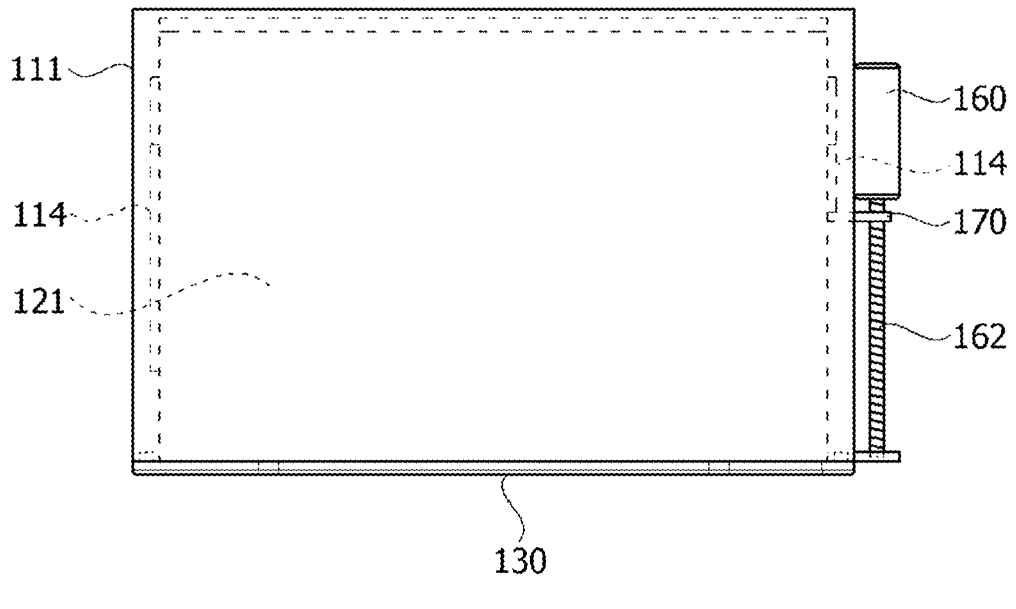
FIG. 15 is a plan view illustrating a steering wheel-mounted button module according to another embodiment of the present disclosure.
Figure 16:
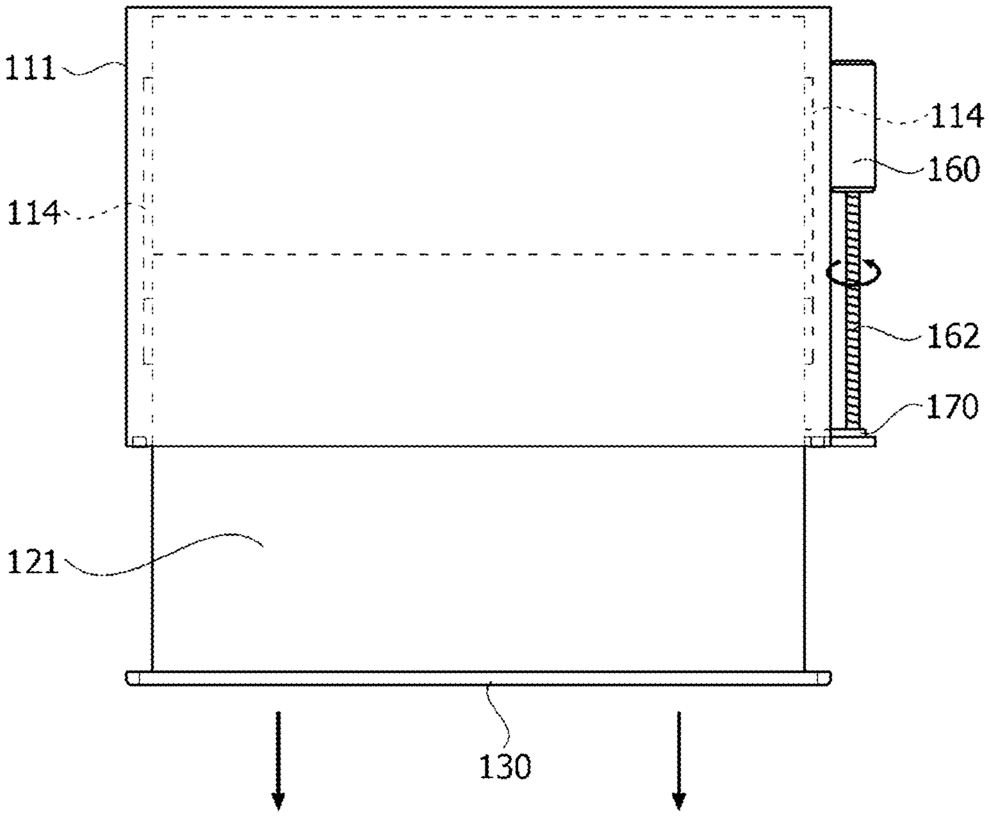
FIG. 16 is a plan view illustrating a steering wheel-mounted button module in the state where a retractable unit is extended according to another embodiment of the present disclosure.

FIG. 13 is a perspective view illustrating a steering wheel-mounted button module according to another embodiment of the present disclosure, FIG. 14 is a perspective view illustrating a steering wheel-mounted button module in the state wherein a button unit is unfolded according to another embodiment of the present disclosure, FIG. 15 is a plan view illustrating a steering wheel-mounted button module according to another embodiment of the present disclosure, and FIG. 16 is a plan view illustrating a steering wheel-mounted button module in the state where a retractable unit is extended according to another embodiment of the present disclosure.

In these drawings, the same components as those described in the above embodiments are assigned the reference numbers increased by 100, and explanations of the same components are omitted for convenience.

As illustrated, the steering wheel-mounted button module according to another embodiment of the present disclosure may include a case 110 mounted on the steering wheel body 1, a retractable unit 120 installed inside the case 110 to be movable forward and backward, and a button unit 140 rotatably installed on the retractable unit 120. With its rear end elastically supported, the button unit 140 can rotate away from the retractable unit 120. The button unit 140 is also equipped with buttons 150 for vehicle control. The steering wheel-mounted button module may also include a drive unit 160 installed on the case 110 to provide power for the movement of the retractable unit 120.

In this embodiment, the retractable unit 120 is configured to be automatically extended from the case 110 via the drive unit 160, without manual operation by the driver. The drive unit 160 may include various driving means, such as a motor. The drive unit 160 may be installed on one side of the case 110. A separate button for operating the drive unit 160 may be provided on the front frame 130 of the retractable unit 120, but the configuration is not limited thereto.

The drive unit 160 is equipped with a gear shaft 162 with threads on its outer surface, allowing the gear shaft 162 to rotate in one direction when the drive unit 160 is activated. For example, when the gear shaft 162 rotates clockwise, the retractable unit 120 extends out of the case 110. When the gear shaft 162 rotates counterclockwise, the retractable unit 120 retracts into the case 110.

The retractable unit 120, on one side thereof, is provided with a gear shaft connector 170 through which the gear shaft 162 passes for interlocking. The inner circumferential surface of the gear shaft connector 170 has threads such that when the gear shaft 162 rotates, the retractable unit 120 moves by screw engagement. In the drawings, the drive unit 160 is shown as being installed only on one side of the case 110, but the configuration is not limited thereto; the drive unit 160 may be installed on both sides of the case 110 to ensure that the retractable unit 120 moves smoothly without deviating to the left or right.

Meanwhile, although not shown in the drawings, when the is automatically extended as in this retractable unit 120 embodiment, the handle 132 may not be provided. This is because the retractable unit 120 can be operated by the drive unit 160 even without the handle 132.

An embodiment of the present disclosure is advantageous in terms of reducing manufacturing costs by eliminating the need for button mounting structures on the center fascia in such a way as to relocate buttons from the center fascia to the steering wheel in a vehicle and capable of maximizing visibility and operability of buttons by allowing manual popup of buttons on the steering wheel other than the center fascia or AVN.

Furthermore, an embodiment of the present disclosure is advantageous in terms of improving driver convenience by enabling easy operation without needing to locate or reach for center fascia buttons and capable of increased AVN size and additional storage space by eliminating the need for dedicated button space and location on the center fascia.

Additionally, an embodiment of the present disclosure is advantageous in terms of enhancing aesthetics by featuring a slim button section to be unfold and popup from the steering towards the driver.

While the foregoing description has focused on specific embodiments of the present disclosure, it should be understood that various modifications and changes can be made by those having ordinary skill in the art without departing from the spirit and scope of the present disclosure.

DESCRIPTION OF REFERENCE NUMERALS

1: steering wheel body
2: rim
10: case
11: lower case
12: upper case
14: guide slot
16: first magnetic member
20: retractable unit
21: main frame
22: side frame
23: rear frame
24: guide protrusion
26: hinge hole
30: front frame
32: handle
34: second magnetic member
40: button unit
41: button pad
42: pin hole
44: hinge pin
46: elastic member
48: step portion
50: button
160: drive unit
162: gear shaft
170: gear shaft connector

What is claimed is:

1. A steering wheel-mounted button module, comprising:
a case mounted on a steering wheel body;
a retractable unit installed inside the case and configured to move forward and backward; and
a button unit rotatably installed on the retractable unit and positionable in a concealed state in which the button unit is positioned inside the case, the button unit having a rear end elastically supported to rotate away from the retractable unit and comprising at least one button,
wherein forward movement of the retractable unit out of the case causes the button unit to rotate toward a front side of the steering wheel body and transition from the concealed state to an exposed state, and
wherein the case and the retractable unit are provided with a first magnetic member and a second magnetic member, respectively, to attract each other.

2. The steering wheel-mounted button module of claim 1, wherein the case is provided with guide slots formed on inner sides thereof into which guide protrusions protruding on sides of the retractable unit are inserted and guided.

3. The steering wheel-mounted button module of claim 1, wherein the case is mounted on an upper surface of the steering wheel body.

4. The steering wheel-mounted button module of claim 3, wherein the first magnetic member is provided on sides of a front end of the case, and the second magnetic member is provided on sides of a rear surface of a front frame attached to the front end of the retractable unit.

5. The steering wheel-mounted button module of claim 1, wherein the retractable unit comprises:
a main frame configured to move within the case;
a front frame extending downward from a front of the main frame;
side frames extending downward from side ends of the main frame; and
a rear frame extending downward from a rear end of the main frame.

6. The steering wheel-mounted button module of claim 5, wherein the side frames are formed from a center to the rear end along the side ends of the main frame.

7. The steering wheel-mounted button module of claim 6, wherein the button unit, at the rear end thereof, is hinged to front ends of the side frames.

8. The steering wheel-mounted button module of claim 5, wherein the front frame is provided with a handle to operate the retractable unit.

9. The steering wheel-mounted button module of claim 8, wherein the handle protrudes downward from sides of a lower end of the front frame.

10. The steering wheel-mounted button module of claim 5, wherein the button unit comprises:
a button pad with the at least one button;
a hinge pin penetrating through a rear end of the button pad and rotatably coupled to the retractable unit; and
an elastic member provided on the hinge pin to elastically support the button pad to rotate away from the retractable unit.

11. The steering wheel-mounted button module of claim 10, wherein the button unit is positioned at a bottom of the main frame, and the hinge pin is rotatably coupled to a front end of the side frames.

12. The steering wheel-mounted button module of claim 10, wherein the button pad is provided with step portions that are situated on sides of the main frame.

13. A steering wheel-mounted button module comprising:

a case mounted on a steering wheel body;

a retractable unit installed inside the case and configured to move forward and backward;

a button unit rotatably installed on the retractable unit and positionable in a concealed state in which the button unit is positioned inside the case, the button unit having a rear end elastically supported to rotate away from the retractable unit and comprising a button; and a drive unit installed on the case to provide power to move the retractable unit, wherein forward movement of the retractable unit out of the case causes the button unit to rotate toward a front of the steering wheel body and transition from the concealed state to an exposed state, and wherein the drive unit is provided with a gear shaft with threads on an outer surface thereof, and the retractable unit, on one side thereof, is provided with a gear shaft connector through which the gear shaft passes, the gear shaft connector having threads formed on an inner circumferential surface thereof.

14. The steering wheel-mounted button module of claim 13, wherein the drive unit is installed on one side of the case.

15. The steering wheel-mounted button module of claim 13, wherein the case comprises guide slots formed on inner sides thereof into which guide protrusions protruding on sides of the retractable unit are inserted and guided.

16. The steering wheel-mounted button module of claim 13, wherein the case is mounted on an upper surface of the steering wheel body.

* * * * *